(12) United States Patent
Schneider et al.

(10) Patent No.: US 8,782,386 B2
(45) Date of Patent: Jul. 15, 2014

(54) DETECTING STATE LOSS ON A DEVICE

(75) Inventors: Janet L. Schneider, Bellevue, WA (US);
Doron J. Holan, Seattle, WA (US);
Randall E. Aull, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 118 days.

(21) Appl. No.: 12/889,722

(22) Filed: Sep. 24, 2010

(65) Prior Publication Data

US 2012/0079258 A1    Mar. 29, 2012

(51) Int. Cl.
*G06F 1/32*    (2006.01)
*G06F 15/177*    (2006.01)

(52) U.S. Cl.
USPC ............... 713/1; 713/100; 713/300; 713/320

(58) Field of Classification Search
None
See application file for complete search history.

(56) References Cited

U.S. PATENT DOCUMENTS

| | | | |
|---|---|---|---|
| 5,519,831 A * | 5/1996 | Holzhammer | 714/22 |
| 5,951,686 A * | 9/1999 | McLaughlin et al. | 713/2 |
| 6,324,651 B2 * | 11/2001 | Kubik et al. | 713/323 |
| 6,438,668 B1 * | 8/2002 | Esfahani et al. | 711/165 |
| 6,732,280 B1 | 5/2004 | Cheok et al. | |
| 6,886,050 B2 | 4/2005 | Takamizawa et al. | |
| 7,072,989 B1 | 7/2006 | Kolokowsky et al. | |
| 7,386,517 B1 * | 6/2008 | Donner | 705/75 |
| 7,631,200 B2 | 12/2009 | Niwa et al. | |
| 2002/0095495 A1 | 7/2002 | Otsuka et al. | |
| 2004/0148536 A1 * | 7/2004 | Zimmer et al. | 713/323 |
| 2004/0268046 A1 * | 12/2004 | Spencer | 711/118 |
| 2007/0250718 A1 * | 10/2007 | Lee et al. | 713/186 |
| 2008/0146149 A1 | 6/2008 | Wisebourt | |
| 2009/0031099 A1 * | 1/2009 | Sartore | 711/162 |
| 2010/0049881 A1 * | 2/2010 | Manor et al. | 710/18 |
| 2010/0153660 A1 * | 6/2010 | Lasser | 711/154 |

OTHER PUBLICATIONS

"Do USB devices get reset on system sleep resume?", Retrieved at << http://blogs.msdn.com/b/usbcoreblog/archive/2009/10/27/do-usb-devices-get-reset-on-sleep-resume.aspx >>, Oct. 26, 2009, p. 1.
"USB Selective Suspend", Retrieved at << http://msdn.microsoft.com/en-us/library/dd450458.aspx >>, Retrieved Date: Jul. 6, 2010, pp. 2.
"Foreign Office Action", Chinese Application No. 201110285478.X, (Jul. 15, 2013), 7 Pages.
"Foreign Office Action", CN Application No. 201110285478.X, Jan. 26, 2014, 6 Pages.

* cited by examiner

*Primary Examiner* — Dennis M Butler
(74) *Attorney, Agent, or Firm* — Tony Azure; Andrew Sanders; Micky Minhas

(57) ABSTRACT

This document describes techniques for detecting state loss on a device. These techniques permit a computer connected to a device to forgo, in many cases, reinitializing the device when returning to a normal-power mode.

20 Claims, 4 Drawing Sheets

DETECTING STATE LOSS ON A DEVICE

BACKGROUND

Computers are often connected to devices, such as thumb drives and fingerprint readers. Many of these devices are initialized by a computer before use. As part of initializing, a computer sets state information on the device. This state information permits ongoing communications between the computer and the device. After the computer initializes the device, however, the computer may enter a low-power mode. During this low-power mode, the device may lose state information. Currently, when the computer returns to a normal-power mode, the computer assumes that the device has lost state information, and so reinitializes the device. Reinitializing the device, however, can be slow, expend computing resources, or impede a user's experience.

SUMMARY

This document describes techniques for detecting state loss on a device. These techniques permit a computer connected to a device to forgo, in many cases, reinitializing the device when returning to a normal-power mode. By so doing, these techniques can save time, save computing resources, or improve a user's experience.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes techniques for detecting state loss on a device. These techniques permit a computer to forgo reinitializing a device when the computer returns to a normal-power mode from a low-power mode. Assume, for example, that a user plugs his password-protected flash-media thumb drive into his laptop computer. The laptop computer initializes state information on the thumb drive, in this case after the user correctly enters his password, which permits the laptop to read and write data to and from the thumb drive. The user then closes the lid of his laptop, which causes the computer to go into a low-power mode. When the user opens the lid of his laptop to continue using the laptop, these techniques permit the laptop to continue to read and write to the user's thumb drive without requiring the user to reenter his password. This is but one example of how these techniques improve a user's experience, save computing resources, and/or save time.

Example Environment

Figure 1:
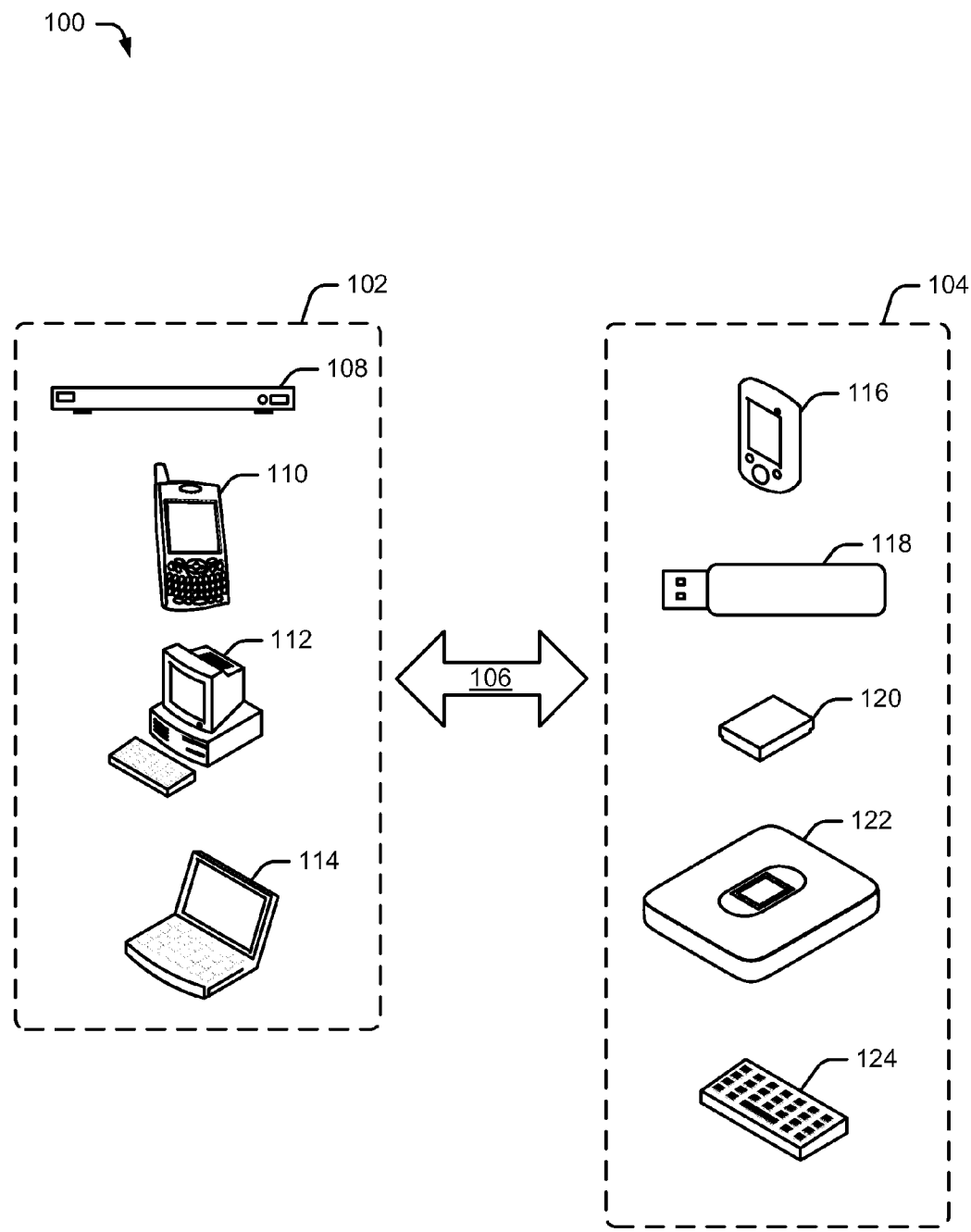
FIG. 1 illustrates an environment in which techniques for detecting state loss on a device can be employed.

FIG. 1 is an illustration of an example environment 100 in which techniques for detecting state loss on a device can be embodied. Environment 100 includes a computer 102, a device 104, and a communication medium 106. Computer 102 is illustrated with four example computing devices: a set-top box 108, a smart phone 110, a desktop computer 112, and a laptop computer 114, though other computing devices and systems, such as servers and tablet computers may also be used. Device 104 is illustrated with five example devices: a media player 116, a protected flash-media thumb-drive 118, an external hard drive 120, a fingerprint reader 112, and a keyboard 124. Other devices may also be used, whether external or internal to computer 102, such as any of the example computers noted above, other biometric devices, and any other devices capable of receiving state information from computer 102. Computer 102 and device 104 communicate through communication medium 106. Communication medium 106 may include a communication network, such as the Internet, a personal-area network (PAN), local-area network (LAN), a wide-area network, or a universal serial bus (USB) hub, as well as wires and ports, such as a USB port.

Figure 2:
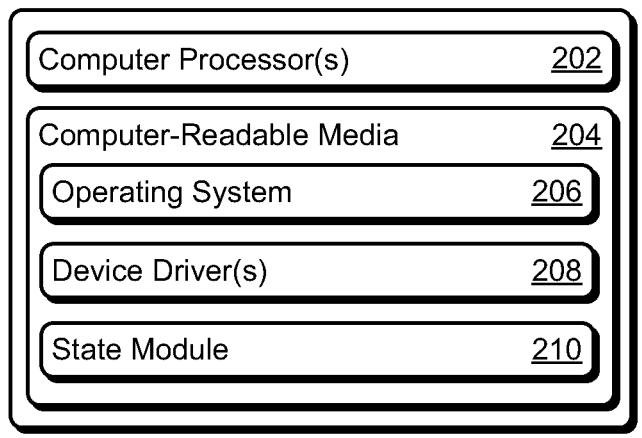
FIG. 2 illustrates in more detail the computer and the device of the environment of FIG. 1.
Figure 2:
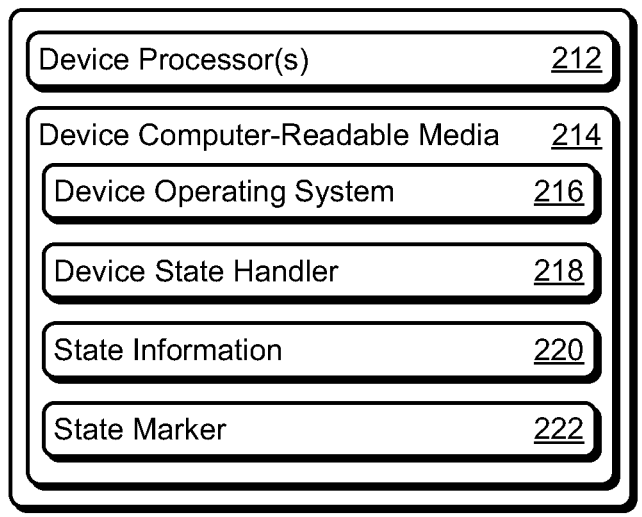

Computer 102 is illustrated in detail in FIG. 2 having computer processor(s) 202 and computer-readable media 204. Computer-readable media 204 includes an operating system 206, device driver(s) 208, and a state module 210.

Device 104 is illustrated in detail in FIG. 2 having device processor(s) 212 and device computer-readable media 214. Device computer-readable media 214 is integral with or accessible by device 104 and includes a device operating system 216, a device state handler 218, state information 220, and a state marker 222. State marker 222 can be a simple binary number, such as one or zero, each of which respectively indicates maintenance of or loss of state information 220. State marker 222 may also be a large unique number and/or a cryptographically secure identifier.

Note that one or more of the entities shown in FIGS. 1 and 2 may be further divided, combined, and so on. Thus, environment 100 illustrates some of many possible environments capable of employing the described techniques. Generally, any of the techniques and abilities described herein can be implemented using software, firmware, hardware (e.g., fixed-logic circuitry), manual processing, or a combination of these implementations. The entities of environment 100 generally represent software, firmware, hardware, whole devices or networks, or a combination thereof. In the case of a software implementation, for instance, the entities (e.g., state module 210 and device state handler 218) represent program code that performs specified tasks when executed on a processor (e.g., processor(s) 202 or 212). The program code can be stored in one or more computer-readable memory devices, such as computer-readable media 204 or 214. The features and techniques described herein are platform-independent, meaning that they may be implemented on a variety of commercial computing platforms having a variety of processors. Ways in which entities of computer 102 and device 104 act are set forth in greater detail below.

Example Processes

The following discussion describes ways in which the techniques may operate to forgo reinitializing a device. Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1 (including as detailed in FIG. 2).

Figure 3:
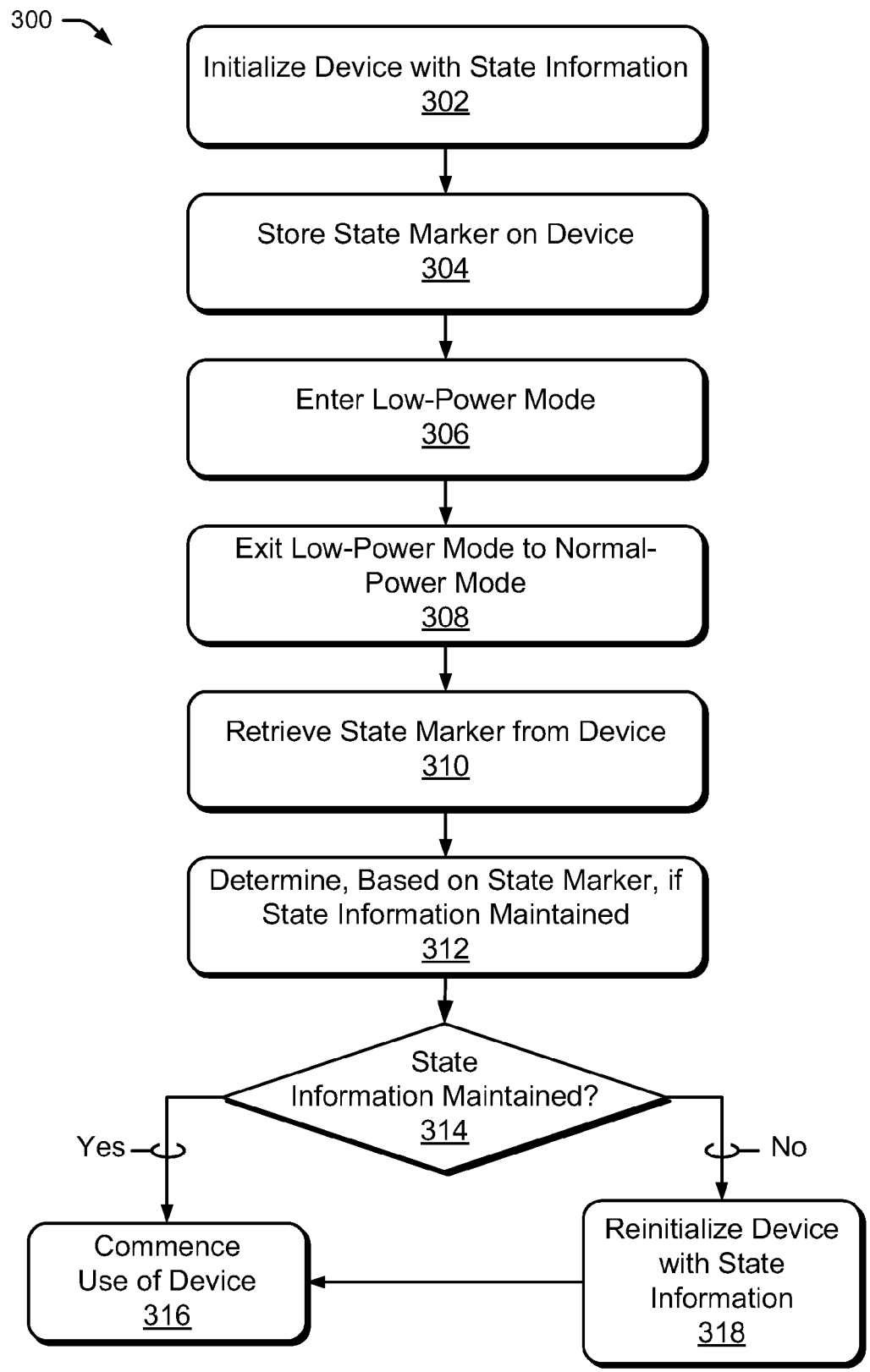
FIG. 3 is a flow diagram depicting an example process, performed by a computer, for detecting state loss on a device.

FIG. 3 is a flow diagram depicting an example process 300 for detecting state loss on a device, the operations of process 300 performed by computer 102.

Block 302 initializes a device with state information. Computer 102, for example, may initialize device 104 when computer 102 is first booted up and has device 104 already attached, or computer 102 is in a normal-power mode and device 104 is put into communication with computer 102.

Block 304 stores a state marker on the device. Storage of the state marker assumes that the device has state information. By way of example, consider the case where state module 210 of desktop computer 112 initializes media player 116 with state information 220 through a wireless personal area network (PAN) at block 302. This initialization with state information 220 permits ongoing use and interactions between desktop computer 112 and media player 116, such as through completion of a handshake protocol having cryptographically secure elements. State module 210 may act independently or work in conjunction with device driver(s) 208.

Following or commensurate with storing state information 220 on device computer-readable media 214 of media player 116, state module 210 stores state marker 222 on device computer-readable media 214. As noted above, device computer-readable media 214 may include volatile memory, in which case state information 220 and state marker 222 are vulnerable to being lost.

Block 306 enters a low-power mode. State module 210 may store state marker 222 at block 304 responsive to beginning or receiving an indication to enter the low-power mode or may be independent of whether or not a low-power mode is being entered. Example low-power modes include suspend modes and hibernate modes, though others are also contemplated. Continuing the ongoing embodiment, assume that operating system 206 causes desktop computer 112 to enter a suspend mode responsive to user inactivity.

Block 308 exits the low-power mode to enter a normal-power mode. At this point computer 102 is not immediately aware of whether or not any devices 104 have maintained state information 220. A device may have lost information, or state information may change, such as by the device losing power or the state information being altered, respectively.

Block 310 retrieves the state marker from the device. Here state module 210 communicates with device 104 to retrieve state marker 222 from device computer-readable media 214. The state marker retrieved at block 310 may be identical to the state marker stored at block 304, the state marker may have changed and so not be identical, or the state marker may not exist (and so also not be identical). These different scenarios depend on whether or not device 104 has lost power, lost communications, has had state information or memory altered, and how the device reacts to these scenarios. Ways in which device 104 acts are described in additional detail as part of process 400 of FIG. 4.

Block 312 determines, based on the state marker retrieved from the device, whether the state information on the device has been lost on the device. If the state marker has been changed or no longer exists, block 312 determines that the state information on the device has not been maintained. This is assumed if state marker 222 was stored at block 304 on the same volatile memory on which the state information was also stored. Thus, if device 104 loses power and thus loses state information 220, state marker 222 will also be lost.

State marker 222 may also be altered, such as by device state handler 218 in response to an indication that device 104 has lost power or communication (e.g., a network or physical connection is severed) or that state information 210 has not been maintained. In such a case, device state handler 218 may set state handler 222 to a number or format predetermined to indicate that state information 220 has been re-initialized, lost, or otherwise not maintained. State information 220 may not have been maintained by its being altered, including by computer 102, such as with a BIOS element of operating system 206.

Block 312 may, however, determine that the state information on device has been lost or otherwise not maintained. Computer 102 can determine that the state marker currently stored on device computer-readable media 214 is identical to the state marker stored on device computer-readable media 214 at block 304.

Continuing the ongoing example, state module 210 compares state marker 222 retrieved at block 310 with a copy of the state marker as it existed when stored at block 304. If these two versions of state marker 222 are found to match, state information 210 is determined to have been maintained during computer 102's time in the low-power mode.

Process 300 proceeds from block 314 along a "Yes" path to block 316 if the state information is maintained or along the "No" path to block 318 if the information is not maintained.

Block 316 commences use of the device. Thus, if the state information was maintained, computer 102 may forgo reinitializing device 104 and instead commence use of the device without using these resources, the additional time to reinitialize, or impeding the user experience. Concluding the ongoing example, if state information 220 is maintained on computer-readable media 214 of media player 116, desktop computer 112 proceeds to communicate with media player 116.

Block 318 reinitializes the device with the state information. Computer 102 then proceeds to use the device at block 316. Thus, in an alternate conclusion of the ongoing example, if state information 220 is not maintained on device computer-readable media 214 by media player 116, desktop computer 112 reestablishes secure communications similarly to the initialization process noted above prior to using media player 116.

Figure 4:
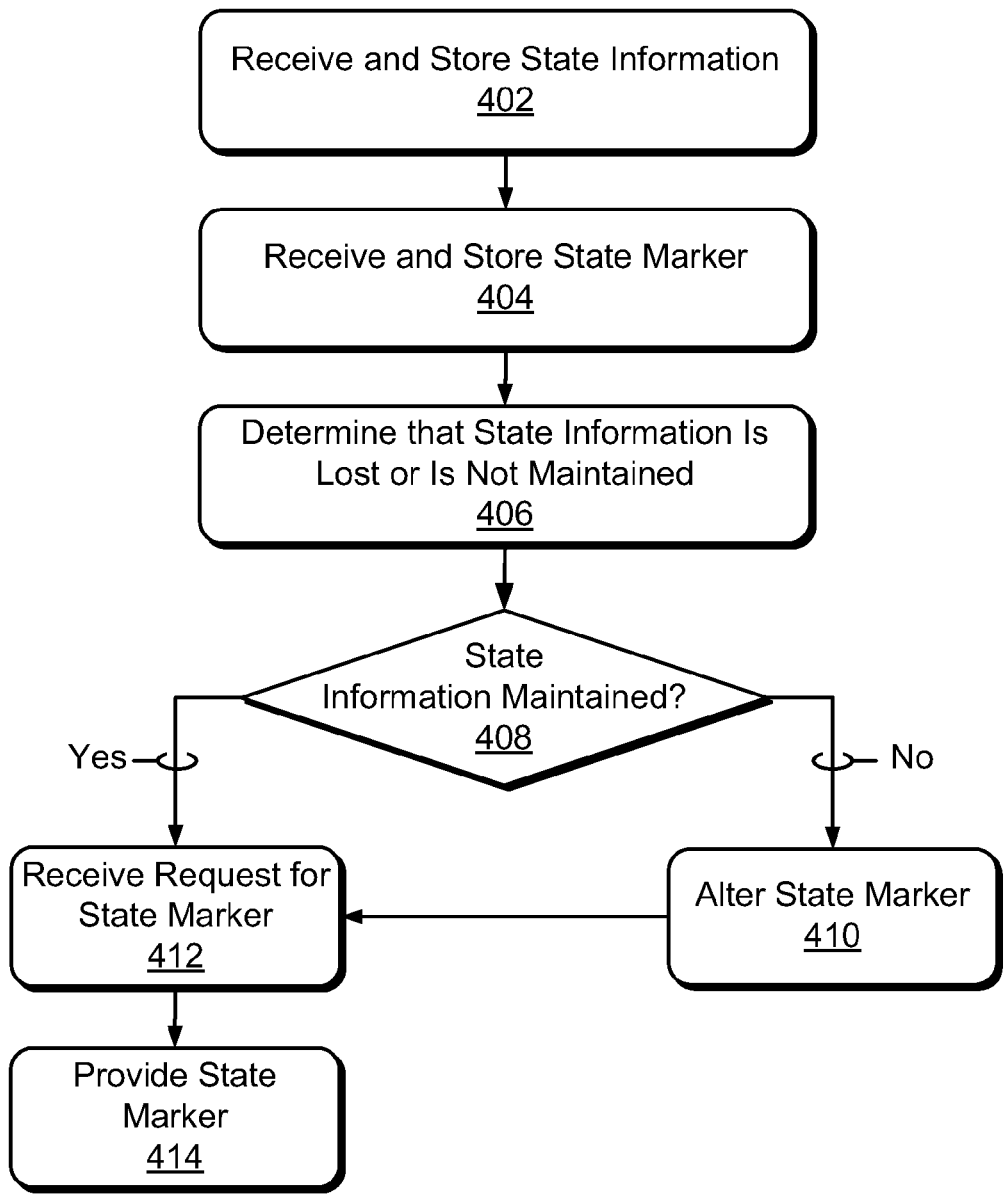
FIG. 4 is a flow diagram depicting an example process, performed by a device, for detecting or enabling detection of a loss of state information.

FIG. 4 is a flow diagram depicting an example process for detecting state information, the process performed by the device.

Block 402 receives and stores state information. Similarly to some embodiments described above, but from the perspective of device 104 rather than computer 102, state information 220 is received from computer 102 with which device 104 connects through communication media 106.

By way of example, consider process 400 in the context of protected flash-media thumb-drive 118 (thumb drive 118) and laptop 114. In this example, thumb drive 118 receives state information from laptop 114 through a USB port. Specifically, device state handler 218 of thumb drive 118 receives state information 220 originating from device driver 208 of laptop 114. This state information 220 establishes secure communication thereby enabling laptop 114 to read and write data to and from thumb drive 118.

Block 404 receives, from the computer and on the device, a state marker and stores that state marker. As noted above, the state marker is associated with state information stored on or intended to be stored on memory integral with the device. If intended to be stored, block 404 may be performed prior to, or concurrent with, block 402. Device 104 may actively store state marker 220 on device computer readable media 214 or passively permit its storage by computer 102.

Block 406 determines that the state information has been lost or maintained. Device state handler 218, for example, may receive an indication that device 104 has lost power or that state information 220 has been altered. If block 406 determines that the state information has been lost, process 400 proceeds through block 408 along the "No" path to block 410. Absent a determination that the state information has been lost, process 400, through block 408, proceeds along the "Yes" path to block 412.

Block 410 alters the state marker to provide an altered state marker or deletes the state marker. By so doing, state marker 222 will not match the state marker received at block 404 and known by computer 102. If block 406 does not determine that state information has not been maintained, device state handler 218 may forgo block 410.

Block 412 receives the request for the state marker stored on the device. State marker 222 will either indicate that state information 220 has been maintained or will indicate that it has not been maintained. Continuing the detailed example above, assume that sometime after receiving and storing the state marker at block 404, laptop 114 enters and exits a low-power mode. During this low-power mode, state information 220 may or may not have been lost on thumb drive 118. When laptop 114 exits the low-power mode, thumb drive 118 receives a request for state marker 222. If during this time state information 220 has been lost or altered, device state handler 218 of thumb drive 118 will alter or delete state marker 222, such as by reverting state marker 222 to a known reset value.

Block 414 provides the altered or unaltered state marker to the computer. Concluding the example, thumb drive 118 provides state marker 222 stored on device computer-readable media 214 through the USB port to device driver 208. By so doing, the state marker provided at block 414 will enable a determination on whether the state information has been lost or maintained. If it has been lost, computer 102 may reinitialize device 104 with state information 220 prior to use. If it has been maintained, device 104 and computer 102 may forgo the reinitializing process.

By way of further example, consider a case where device 104 is fingerprint reader 122. Initializing biometric devices, such as reader 122, often includes building and/or providing biometric templates from computer 102 to fingerprint reader 122. This is one example of state information 220. If computer 102 is suspended or hibernated after initializing fingerprint reader 122 with the biometric templates, these techniques enable determination of whether or not the biometric templates have been lost during this suspend or hibernate mode. If they had been maintained, computer 102 may forgo building and/or providing these biometric templates to fingerprint reader 122. Instead of initializing the biometric reader, computer 102 can immediately use the reader to accept a biometric reading by the reader.

From a user's perspective, this may enable a quicker return to full use of computer 102. If fingerprint reader 122 is being used by computer 102 to authenticate a user on returning to a normal-power mode, the user will experience less of a delay before being able to submit a fingerprint scan to fingerprint reader 122 to enable use of computer 102. This is but one additional example of the many ways in which these techniques can improve a user experience, as well as save computing resources and time.

CONCLUSION

This document describes techniques for detecting state loss on a device. By so doing, a computer may forgo reinitializing the device following a low-power mode, thereby saving computing resources, saving time, and/or improving a user's experience. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   storing a state marker configured to reset in response to an event on a device, the device having state information specific to the device, initialized by a computer in communication with the device, and enabling use of the device by the computer;
   entering a low-power mode;
   exiting the low-power mode to a normal-power mode;
   retrieving the state marker from the device;
   determining, based on the state marker, that the state information on the device has been maintained on the device and the event did not occur; and
   responsive to determining that the state information has been maintained on the device, using the device without reinitializing the device with the state information.

2. The method as recited in claim 1, wherein the act of storing is on volatile memory on which state information is also stored.

3. The method as recited in claim 1, wherein the act of storing is on memory integral with the device.

4. The method as recited in claim 1, wherein the device is a protected flash-media thumb drive and using the device includes reading data from and writing data to the device.

5. The method as recited in claim 1, wherein the device is a biometric reader and using the device includes acceptance of a biometric reading by the device without providing a biometric template after exiting the low-power mode.

6. The method as recited in claim 1, wherein the device is in communication with the computer using a personal-area network and using the device includes cryptographically secure communication between the device and the computer over the personal-area network.

7. The method as recited in claim 1, wherein the low-power mode is a suspend mode or a hibernation mode.

8. The method as recited in claim 1, further comprising storing a copy of the state marker on memory accessible by the computer, and wherein the act of determining includes comparing the state marker retrieved from the device with the copy of the state marker.

9. A method comprising:
   receiving, from a computer and at a device, a state marker, the state marker associated with state information for the device stored on or intended to be stored on memory integral with the device, the state information for the device enabling use of the device by the computer;
   storing the state marker on the memory;
   determining that the state information has not been maintained;
   altering, by the device, the state marker to provide an altered state marker; and
   providing the altered state marker responsive to a request by the computer.

10. The method as recited in claim 9, wherein the memory integral with the device is volatile memory and the act of determining includes receiving an indication of a loss in power at the device.

11. The method as recited in claim 9, wherein the act of altering the state marker resets the state marker to a known reset value.

12. A method comprising:
- storing a state marker configured to reset in response to an event on a device, the device external to a computer and having state information for the device enabling use of the device by the computer;
- entering a low-power mode;
- exiting the low-power mode to a normal-power mode;
- retrieving the state marker from the device;
- determining, based on the state marker, that the event has occurred and the state information on the device has not been maintained on the device;
- responsive to determining that the state information has not been maintained, reinitializing the device with the state information; and
- using the device.

13. The method as recited in claim 12, wherein the act of storing is on volatile memory on which state information is also stored.

14. The method as recited in claim 12, wherein the act of storing is on memory integral with the device.

15. The method as recited in claim 12, wherein the device is a protected flash-media thumb drive and using the device includes reading data from and writing data to the device.

16. The method as recited in claim 12, wherein the device is a biometric reader and using the device includes acceptance of a biometric reading by the device after reinitializing the device with second state information, the second state information including a biometric template.

17. The method as recited in claim 12, wherein the device is in communication with the computer using a personal-area network and using the device includes cryptographically secure communication between the device and the computer over the personal-area network.

18. The method as recited in claim 12, wherein the low-power mode is a suspend mode or a hibernation mode.

19. The method as recited in claim 12, further comprising storing a copy of the state marker on memory accessible by the computer, and wherein the act of determining includes comparing the state marker retrieved from the device with the copy of the state marker.

20. The method as recited in claim 12, wherein the state information includes cryptographic information sufficient to permit secure use of the device.

* * * * *